United States Patent
Shimizu

(10) Patent No.: US 8,970,905 B2
(45) Date of Patent: Mar. 3, 2015

(54) PROFILE SETTING APPARATUS, PROFILE SETTING METHOD, STORAGE MEDIUM, AND PROFILE MANAGING SYSTEM

(71) Applicant: FUJIFILM Corporation, Tokyo (JP)

(72) Inventor: Ryo Shimizu, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/875,032

(22) Filed: May 1, 2013

(65) Prior Publication Data
US 2013/0293904 A1 Nov. 7, 2013

(30) Foreign Application Priority Data

May 2, 2012 (JP) ................................. 2012-105125

(51) Int. Cl.
*H04N 1/60* (2006.01)
*G06F 3/12* (2006.01)

(52) U.S. Cl.
CPC ............ *G06F 3/1257* (2013.01); *G06F 3/1205* (2013.01); *G06F 3/1288* (2013.01)
USPC ........................................... 358/1.9; 358/1.18

(58) Field of Classification Search
USPC .............................. 358/1.9, 2.1, 1.6, 3.28, 1.18
See application file for complete search history.

(56) References Cited

U.S. PATENT DOCUMENTS

| | | | |
|---|---|---|---|
| 6,044,173 A | 3/2000 | Kumada | |
| 6,048,117 A * | 4/2000 | Banton | .................... 400/120.09 |
| 8,139,275 B2 | 3/2012 | Watanabe | |
| 2004/0174548 A1* | 9/2004 | Ono | ............................... 358/1.9 |
| 2005/0212970 A1* | 9/2005 | Joskin | ........................... 348/572 |
| 2005/0270587 A1 | 12/2005 | Yamakawa et al. | |
| 2008/0007784 A1* | 1/2008 | Tsuji | ............................... 358/2.1 |
| 2010/0277753 A1* | 11/2010 | Shinchi | ........................ 358/1.9 |
| 2011/0304863 A1* | 12/2011 | Shibuya | ........................ 358/1.9 |
| 2012/0002870 A1 | 1/2012 | Sugita | |
| 2013/0100465 A1* | 4/2013 | Fischer et al. | ................. 358/1.9 |
| 2013/0100466 A1* | 4/2013 | Fischer et al. | ................. 358/1.9 |

FOREIGN PATENT DOCUMENTS

| | | |
|---|---|---|
| JP | 7-222009 A | 8/1995 |
| JP | 2005-94261 A | 4/2005 |
| JP | 2006-287281 A | 10/2006 |
| JP | 2011-55379 A | 3/2011 |
| JP | 2011-223620 A | 11/2011 |
| JP | 2012-15673 A | 1/2012 |

OTHER PUBLICATIONS

Extended European Search Report for European Application No. 13166017.7, dated Feb. 5, 2014.
Japanese Office Action, dated Jun. 3, 2014, for Japanese Application No. 2012-105125, including English translation.

* cited by examiner

*Primary Examiner* — Jerome Grant, II
(74) *Attorney, Agent, or Firm* — Birch, Stewart, Kolasch & Birch, LLP

(57) ABSTRACT

A combination of types of a printing device, a print medium, an input color space characteristic which is a color space characteristic of an object to be reproduced, and an output color space characteristic which is a color space characteristic of a print, is designated with respect to a printing job to be executed. A device link profile corresponding to the designated combination is set with respect to the printing job to be executed.

8 Claims, 7 Drawing Sheets

MEDIUM PROFILE EDITING

NAME [Media Profile] ~84

[CANCEL] [SAVE] ~82

MEDIUM TYPE ~86

| NAME | FORM | BASIS WEIGHT | COATING | WIDTH | HEIGHT | THICKNESS |
|---|---|---|---|---|---|---|
| Media-1 | ROLL | 120 | GLOSSY | 1000 | | 0.1 |
| Media-2 | ROLL | 160 | GLOSSY | 1000 | | 0.1 |
| Media-3 | ROLL | 200 | GLOSSY | 1000 | | 0.1 |
| Media-4 | ROLL | 260 | GLOSSY | 1000 | | 0.1 |

~90

[NEW] [EDIT] [DELETE] ~92

COLOR CONVERSION SETTINGS ~88

| INPUT COLOR SPACE CHARACTERISTICS | OUTPUT COLOR SPACE CHARACTERISTICS | COLOR CONVERSION SETTINGS |
|---|---|---|
| Default | Device-A-glossy | DLP-default |
| Coated FOGRA 39 | Device-A-glossy | DLP-1 |
| Japan Color2001 Coated | Device-A-glossy | DLP-2 |

~94

[GENERATE PROFILE] [ADD] [EDIT] [DELETE] ~96

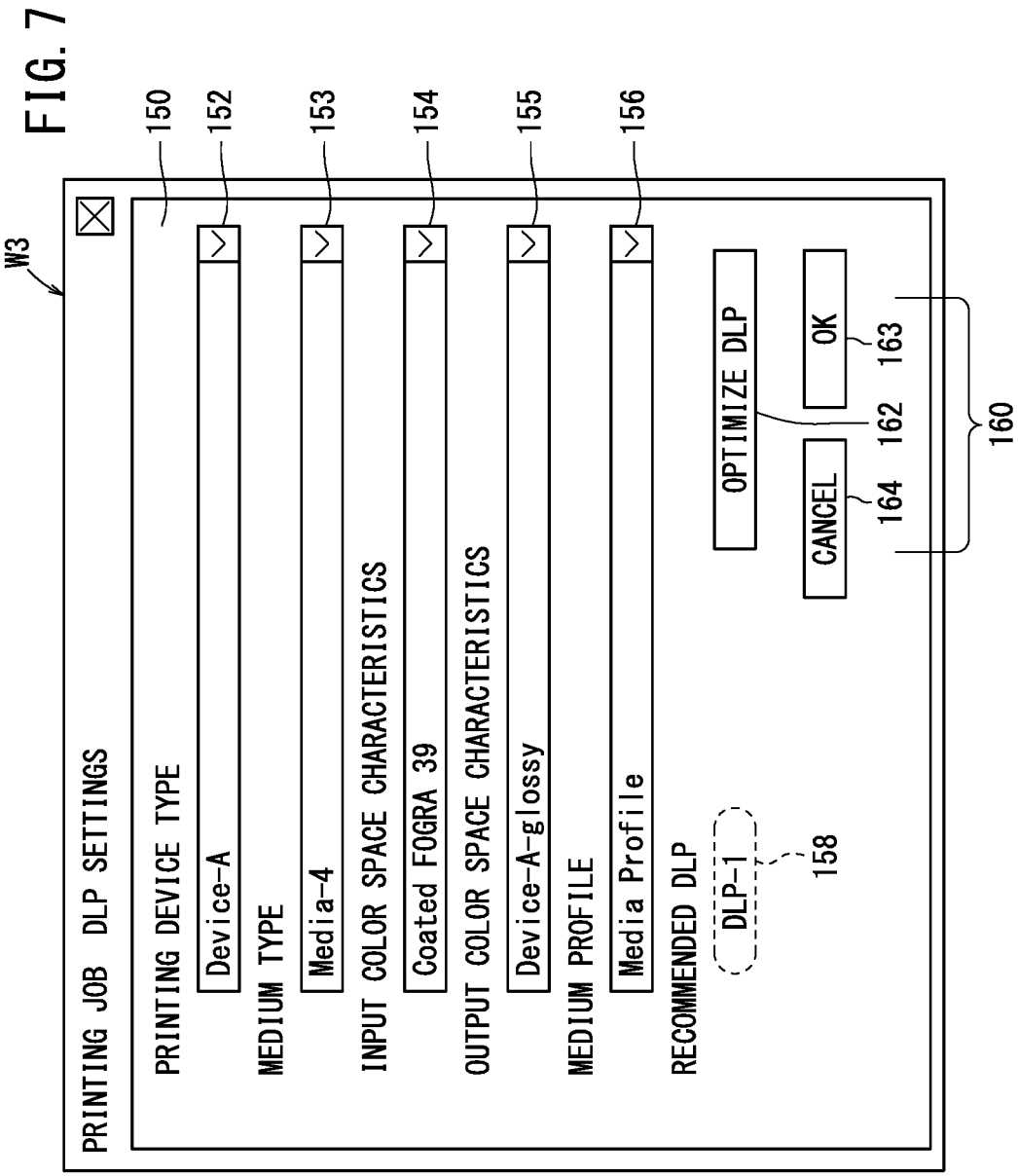

PROFILE SETTING APPARATUS, PROFILE SETTING METHOD, STORAGE MEDIUM, AND PROFILE MANAGING SYSTEM

CROSS-REFERENCE TO RELATED APPLICATION

This application is based upon and claims the benefit of priority from Japanese Patent Application No. 2012-105125 filed on May 2, 2012, the contents of which are incorporated herein by reference.

BACKGROUND OF THE INVENTION

1. Field of the Invention

The present invention relates to a profile setting apparatus, a profile setting method, a storage medium, and a profile managing system for setting a device link profile for each of respective printing jobs, as a job execution unit for producing a print by forming an image on a print medium with a printing device.

2. Description of the Related Art

Recently, workflow of printing processes has been digitized as a whole in view of the widespread use of DTP (Desktop Publishing) and CTP (Computer To Plate) processes. For example, various technologies in relation to a color conversion process using ICC (International Color Consortium) profiles, particularly device link profiles (hereinafter referred to as "DLPs"), for example, have been proposed.

Japanese Laid-Open Patent Publication No. 2011-055379 proposes a user interface technology for setting at least two types of conditions for generating a plurality of DLPs together. More specifically, the publication discloses that settings for generating DLPs can easily be established by setting common items together.

According to Japanese Laid-Open Patent Publication No. 2012-015673, an apparatus and method are disclosed for detecting whether or not an output profile should be updated, and for automatically generating and updating a DLP using the updated output profile.

SUMMARY OF THE INVENTION

In particular, in recent years, many examples have appeared in which efforts are made to operate printing systems according to domestic and international standards, such as FOGRA, as part of a quality management procedure. It is desirable for DLPs to be generated in compliance with various standards. In accordance therewith, it also is expected that the number of DLPs to be managed will increase.

Each time that a printing job is executed, it is necessary to select and set an appropriate DLP from among a number of DLPs held in storage. The operator finds it tedious and time-consuming to perform the task of setting such a DLP. If many choices are available for DLPs, then the operator may select an inappropriate DLP due to human-induced errors.

According to the methods disclosed in Japanese Laid-Open Patent Publication No. 2011-055379 and Japanese Laid-Open Patent Publication No. 2012-015673, attention is paid only to a setting process for generating DLPs. Nothing is disclosed in relation to making the setting process more efficient for selecting a DLP suitable for a printing job.

It is an object of the present invention to provide a profile setting apparatus, a profile setting method, a storage medium, and a profile managing system, which are capable of easily and reliably setting a device link profile suitable for a printing job.

According to the present invention, there is provided a profile setting apparatus for setting a device link profile for each of respective printing jobs as a job execution unit for producing a print, by forming an image on a print medium with a printing device, comprising a printing condition designator for designating, with respect to a printing job to be executed, a combination of types of the printing device, the print medium, an input color space characteristic which is a color space characteristic of an object to be reproduced, and an output color space characteristic which is a color space characteristic of the print, and a profile setter for setting a device link profile corresponding to the combination designated by the printing condition designator, with respect to the printing job to be executed.

The profile setting apparatus includes the printing condition designator for designating, with respect to a printing job to be executed, a combination of types of the printing device, the print medium, an input color space characteristic which is a color space characteristic of an object to be reproduced, and an output color space characteristic which is a color space characteristic of the print, and the profile setter for setting a device link profile corresponding to the combination designated by the printing condition designator, with respect to the printing job to be executed. Therefore, a device link profile can be selected irrespective of the type of device link profile, and a device link profile that is suitable for a printing job can be set easily and reliably.

The profile setting apparatus preferably further comprises a profile retriever for retrieving the device link profile corresponding to the combination, by referring to a database with respect to the device link profile, and the profile setter preferably sets the device link profile that is retrieved by the profile retriever.

If a device link profile corresponding to the combination does not exist, the profile retriever preferably selects a predetermined default device link profile.

A color conversion setting representing a set of types of the input color space characteristic, the output color space characteristic, and the device link profile preferably is defined as a data set in the database.

A medium profile representing a set of at least one type of the print medium and at least one type of the color conversion setting preferably is defined as a data set in the database.

A set of one type of the printing device and at least one type of the medium profile preferably is defined as a data set in the database.

According to the present invention, there also is provided a profile setting method to be carried out using an apparatus for setting a device link profile for each of respective printing jobs as a job execution unit for producing a print, by forming an image on a print medium with a printing device, comprising the steps of designating, with respect to a printing job to be executed, a combination of types of the printing device, the print medium, an input color space characteristic which is a color space characteristic of an object to be reproduced, and an output color space characteristic which is a color space characteristic of the print, and setting a device link profile corresponding to the designated combination with respect to the printing job to be executed.

According to the present invention, there further is provided a non-transitory storage medium storing therein a program for setting a device link profile for each of respective printing jobs as a job execution unit for producing a print, by forming an image on a print medium with a printing device, the program enabling a computer to perform the steps of designating, with respect to a printing job to be executed, a combination of types of the printing device, the print medium, an input color space characteristic which is a color space characteristic of an object to be reproduced, and an output color space characteristic which is a color space characteristic of the print, and setting a device link profile corresponding to the designated combination with respect to the printing job to be executed.

According to the present invention, there also is provided a profile managing system comprising the aforementioned profile setting apparatus, and a server capable of communicating with the profile setting apparatus, wherein the database is constructed in the server.

With the profile setting apparatus, the profile setting method, the storage medium, and the profile managing system according to the present invention, a combination of types of the printing device, the print medium, an input color space characteristic which is a color space characteristic of an object to be reproduced, and an output color space characteristic which is a color space characteristic of the print, is designated with respect to a printing job to be executed. Further, a device link profile corresponding to the designated combination is set with respect to the printing job to be executed. Therefore, a device link profile can be selected irrespective of the type of device link profile, and a device link profile that is suitable for a printing job can be set easily and reliably.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a view showing a first editing screen by way of example;

FIG. 7 is a view showing a setting screen by way of example.

DESCRIPTION OF THE PREFERRED EMBODIMENTS

A profile setting method according to a preferred embodiment of the present invention, in relation to a profile setting apparatus, a storage medium, and a profile managing system for carrying out the profile setting method, will be described in detail below with reference to the accompanying drawings.

Figure 1:
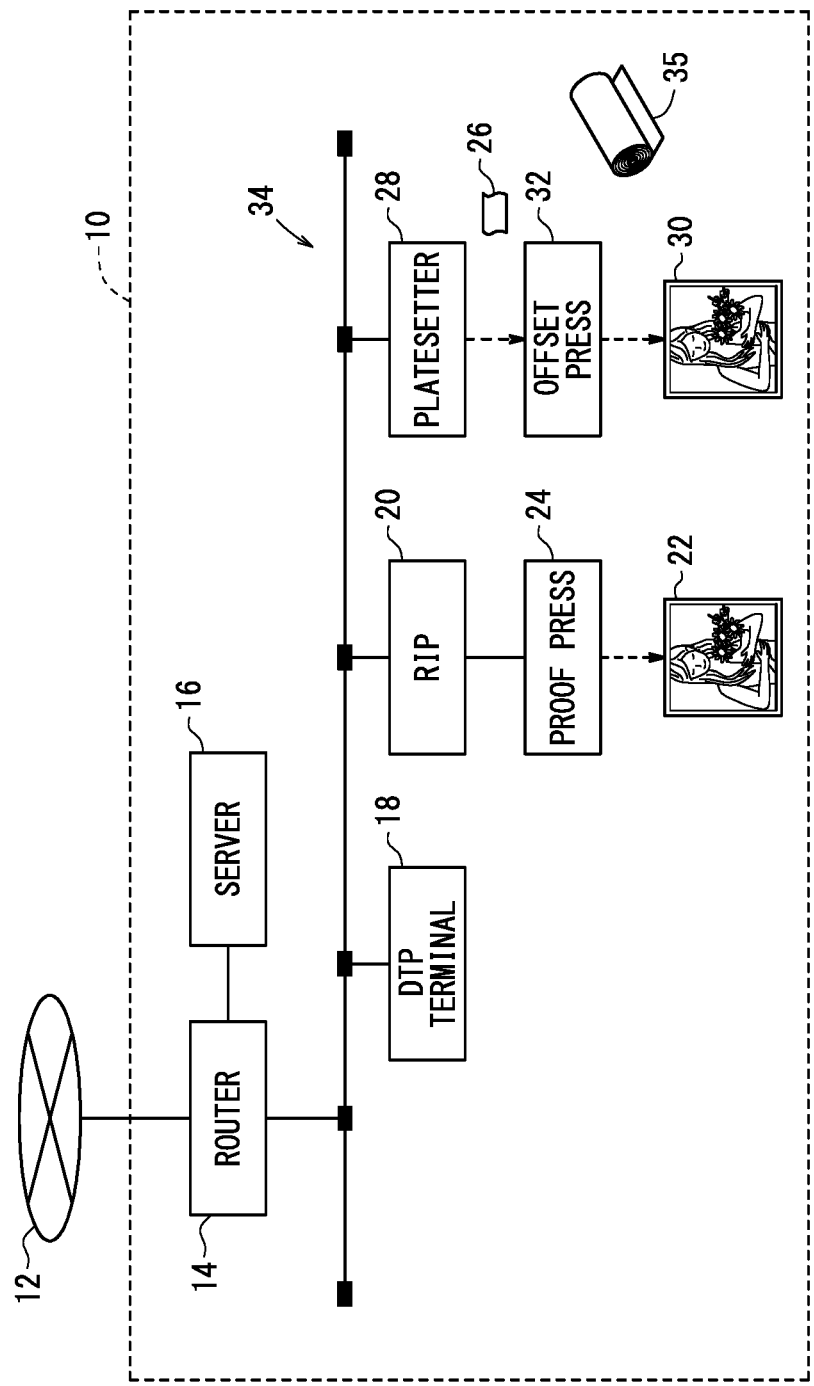
FIG. 1 is a block diagram of a print production system incorporating a raster image processor (RIP) as a profile setting apparatus according to an embodiment of the present invention.

FIG. 1 shows in block form a print production system 10 (profile managing system) incorporating a raster image processor (RIP) 20 as a profile setting apparatus according to an embodiment of the present invention.

As shown in FIG. 1, the print production system 10 includes a router 14 as a device connected to a network 12, a server 16 accessible through the network 12 from terminal devices, not shown, that belong to external networks, a DTP (Desktop Publishing) terminal 18 for performing a DTP process including a process of editing content data acquired from the server 16 or the like, a raster image processor (RIP) 20 (profile setting apparatus) for performing various image processing techniques such as a rasterizing process, a color conversion process, etc., on proofread data or platemaking data generated by the DTP terminal 18, a proof press 24 (printing device) for printing a proof 22 as a print based on proofread data sent from the RIP 20, a platesetter 28 for producing printing plates 26 based on platemaking data sent from the RIP 20, and an offset press 32 (printing device) for printing a print 30 with printing plates 26 that are mounted in the offset press 32.

The server 16 is a core device for implementing workflow management in the print production system 10. The server 16 is connected through the router 14 and the network 12 for communication with terminal devices of at least one of designers and production companies, not shown. The server 16 also is connected for communication with the DTP terminal 18, the RIP 20, and the platesetter 28, through a LAN (Local Area Network) 34 that makes up part of the print production system 10.

The server 16 is arranged to perform a function as a file server for storing and transferring various data files, a function as an authority management server for managing task authorities that can be carried out by terminals, users, or printing jobs, and a function as a mail server for generating and distributing notice mails at given times such as the start and end of various processes. The various data files that can be managed by the server 16 as the file server include content data files, proof data files, platemaking data files, job ticket files, e.g., JDF (Job Definition Format) files, ICC (International Color Consortium) profiles, color sample data files, etc. According to ICC, various profiles such as input profiles, output profiles, color space profiles, and device link profiles (hereinafter referred to as "DLPs"), etc., are defined.

The DTP terminal 18 generates edited data per page from content data representing characters, figures, patterns, pictures, etc., which have been processed by a preflight process. The DTP terminal 18 also performs an imposing process in accordance with a binding process and a page folding process, which have been designated, by referring to the tag information of a job ticket.

The RIP 20 functions as a print processing server for at least one printing press. In FIG. 1, the RIP 20 is connected for communication with the proof press 24 and the platesetter 28. The RIP 20 converts PDL-format data described in a page description language (hereinafter referred to as "page description data") into print data suitable for an output press, and supplies the print data to the proof press 24 or the platesetter 28.

The proof press 24 prints a proof 22 based on printing data supplied from the RIP 20. The proof press 24 may comprise a DDCP (Direct Digital Color Proofer), an ink jet color proofer, a low-resolution color laser printer (electrophotographic printer), an ink jet printer, or the like.

The offset press 32 applies inks to a print medium 35 (recording medium) through printing plates 26 and intermediate transfer mediums, not shown, in order to produce a print 30. The offset press 32 may be replaced with a digital printing press for direct printing. The digital printing press may comprise an ink jet color proofer, a color laser printer (electrophotographic printer), or the like.

Figure 2:
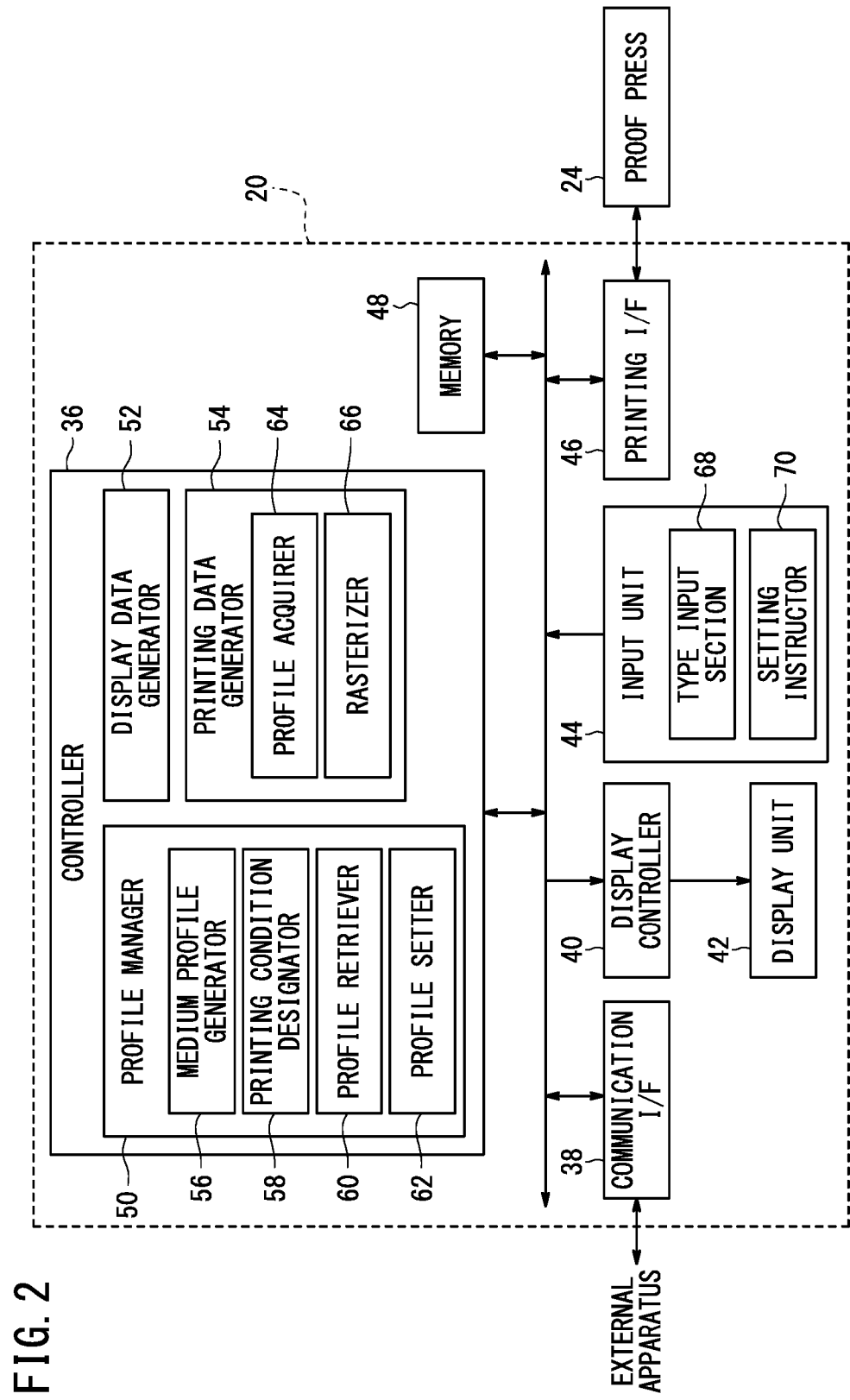
FIG. 2 is an electric block diagram of the RIP shown in FIG. 1.

FIG. 2 is an electric block diagram of the RIP 20 shown in FIG. 1. The RIP 20 comprises a computer including a controller 36, a communication I/F 38, a display controller 40, a display unit 42, an input unit 44, a print I/F 46, and a memory 48 (storage medium).

The communication I/F 38 is an interface for sending electric signals to and receiving electric signals from various external apparatus. For example, the communication I/F 38 can acquire various items of information such as proof data, platemaking data, ICC profiles, etc., which are managed and saved in the server 16 (see FIG. 1).

The display controller 40 comprises a control circuit for controlling the display unit 42 under the control of the controller 36. More specifically, in a case where the display controller 40 outputs a display control signal to the display unit 42 via a non-illustrated I/F, the display unit 42 is energized to display various images including a window W1 (see FIG. 4), a window W2 (see FIG. 5), and a window W3 (see FIG. 7).

The print I/F 46 is an interface for sending electric signals representing printing data to the proof press 24, which prints a desired proof 22.

The memory 48 stores programs and data, which are required for the controller 36 to control various components. The memory 48 may comprise a non-transitory computer-readable recording medium such as a nonvolatile memory, a hard disk, or the like.

The controller 36 comprises a processor such as a CPU (Central Processing Unit) or the like. The controller 36 performs various routines to function as a profile manager 50, a display data generator 52, and a print data generator 54, by reading and executing programs stored in the memory 48.

The profile manager 50 manages ICC profiles, particularly information with respect to DLPs. More specifically, the profile manager 50 includes a medium profile generator 56 for generating medium profiles, a printing condition designator 58 for designating printing conditions suitable for printing jobs, a profile retriever 60 for retrieving DLPs from within a certain retrieval range, and a profile setter 62 for setting DLPs that are suitable for printing jobs.

Printing conditions that are suitable for printing jobs include various types of printing devices such as the offset press 32, etc., (hereinafter referred to as "printing device types"), types of print mediums 35 (hereinafter referred to as "medium types"), types of color space characteristics to be reproduced (hereinafter referred to as "input color space characteristic types"), and types of color space characteristics for prints 30 (hereinafter referred to as "output color space characteristic types"). The input color space characteristic types and the output color space characteristic types may be collectively referred to as "color space characteristic types".

The display data generator 52 generates a first editing screen 80 (see FIG. 4) and a second editing screen 100 (see FIG. 5) used for editing profiles, and a setting screen 150 (see FIG. 7) used for setting profiles.

The print data generator 54 generates printing data representing a proof 22 or a print 30 by performing a desired image processing technique on the page description data. The print data generator 54 includes a profile acquirer 64 for acquiring DLPs used for printing, and a rasterizer 66 for performing a rasterizing process on the imposed page description data. The rasterizing process includes a data format converting process for converting data from a PDL format into a raster format, and a color matching process using ICC profiles (DLPs).

The input unit 44 comprises various input devices including a mouse, a track ball, a keyboard, etc. The display function of the display unit 42 and the input function of the input unit 44 are used in combination as a user interface. The input unit 44 functions as a type input section 68 for inputting printing device types, medium types, and color space characteristic types, and a setting instructor 70 for setting and instructing DLPs to be applied to printing jobs.

The RIP 20, which serves as a profile setting apparatus according to the present embodiment, is basically constructed as described above. Operations of the RIP 20 will be described in detail below with reference to the flowchart shown in FIG. 3.

Figure 3:
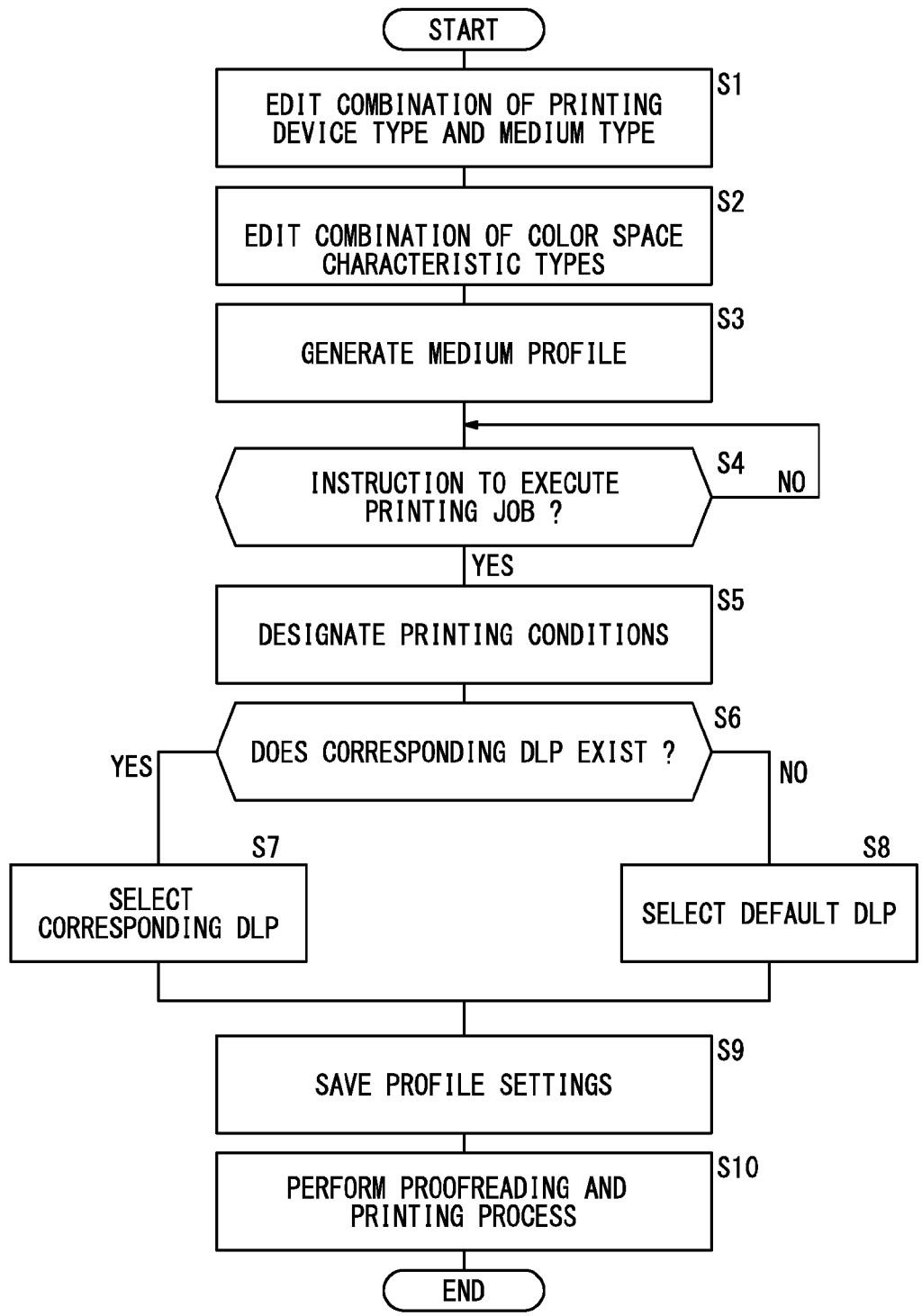
FIG. 3 is a flowchart of an operation sequence of the RIP shown in FIGS. 1 and 2.

In step S1 shown in FIG. 3, the profile manager 50 edits a combination of a printing device type and a medium type. Prior to such editing, the RIP 20 displays the first editing screen 80 for use in editing profiles. Responsive to an instruction to start editing profiles, the display data generator 52 generates display data for the first editing screen 80, and then supplies the generated display data to the display controller 40. The display controller 40 displays a window W1 including the first editing screen 80 on the display unit 42, as shown in FIG. 4.

As shown in FIG. 4, the first editing screen 80 includes a button group 82, a name setting field 84, a medium type setting field 86, and a color conversion setting field 88. The medium type setting field 86 functions as the type input section 68 for inputting medium types.

The name setting field 84 comprises a text box. An operator can enter the name of a medium profile in the name setting field 84 by operating the input unit 44, such as a keyboard, for example. The term medium profile refers to a data set for setting and managing printing conditions in a comprehensive manner relative to the print medium 35. The data structure of the medium profile will be described later.

The medium type setting field 86 includes a field 90 for displaying a list of medium types that belong to the medium profile, and a button group 92 for instructing medium types to be added, edited, and deleted. The field 90 displays a list of various information items concerning medium types, i.e., names, forms (roll, sheet, etc.), basis weight (in units of $g/m^2$), coatings (glossy, matte, etc.), widths, heights, and thicknesses (all in units of mm), of print mediums 35.

The color conversion setting field 88 includes a field 94 for displaying a list of color space characteristic types that belong to the medium profile, and a button group 96 for instructing color conversion settings to be added, edited, and deleted. The field 94 displays a list of various information items concerning color conversion settings, i.e., input color space characteristic types, output color space characteristic types, and color conversion settings (DLP names).

Figure 5:
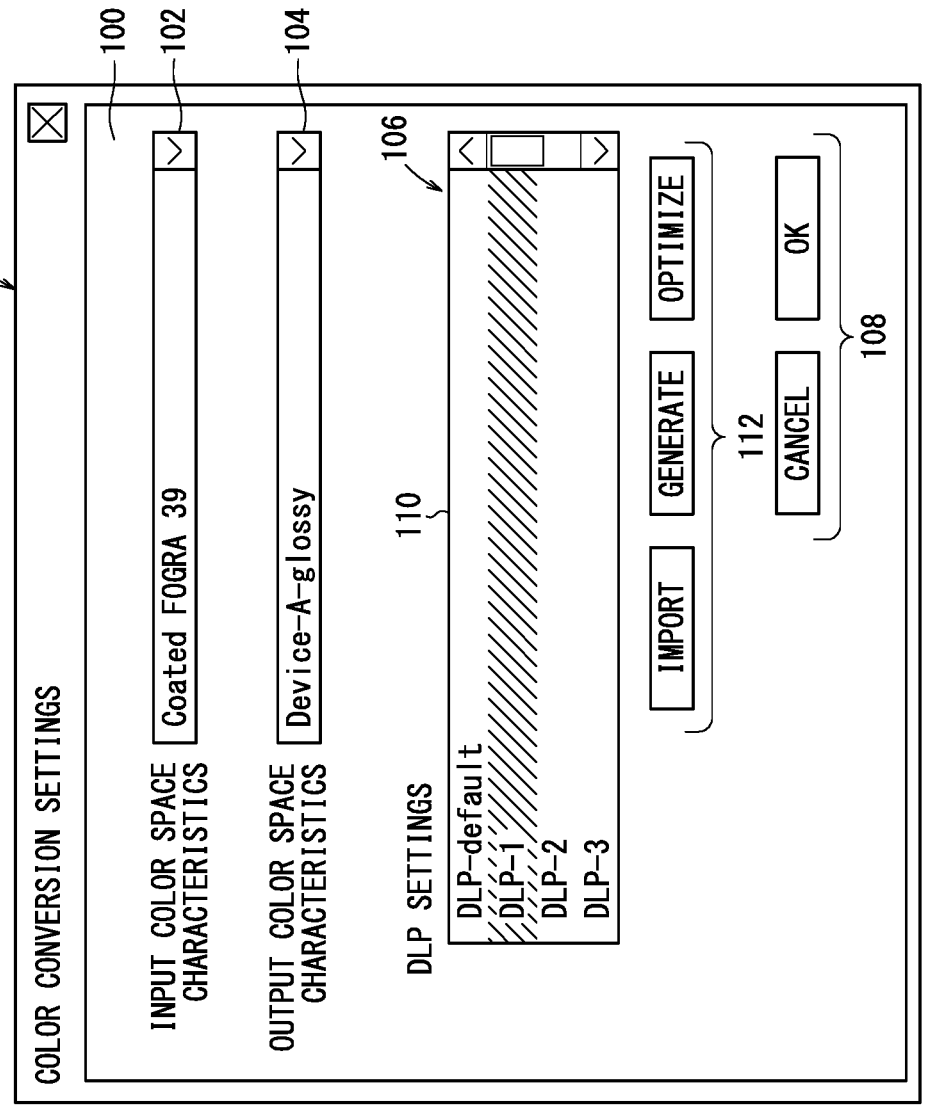
FIG. 5 is a view showing a second editing screen by way of example.

In step S2, the profile manager 50 edits a combination of an input color space characteristic type and an output color space characteristic type. In response to the operator clicking on a button of the button group 96, in particular, the "ADD" or the "EDIT" button, the display data generator 52 generates display data for the second editing screen 100, and supplies the display data to the display controller 40. As shown in FIG. 5, the display controller 40 displays a window W2 including the second editing screen 100 on the display unit 42.

As shown in FIG. 5, the second editing screen 100 includes an input characteristics setting field 102, an output characteristics setting field 104, a DLP setting field 106, and a button group 108. The input characteristics setting field 102 and the output characteristics setting field 104 function collectively as the type input section 68 for inputting color space characteristic types.

The input characteristics setting field 102 comprises a combo box. The operator can enter an input color space characteristic type in the input characteristics setting field 102 by operating the input unit 44 such as a keyboard, for example. Input color space characteristics may include FOGRA (Fogra Graphic Technology Research Association), SWOP (Specifications Web Offset Printing), GRACoL (General Requirements for Applications in Commercial Offset Lithography), JapanColor, JMPA color (magazine advertisement standards), etc.

The output characteristics setting field 104 comprises a combo box. The operator can enter an output color space characteristic type in the output characteristics setting field 104 by operating the input unit 44 such as a keyboard, for example. Output color space characteristics may include, in addition to the aforementioned standard color space characteristics such as FOGRA, etc., a profile produced by colorimetrically measuring an actual printed color chart, i.e., color space characteristics inherent in a printing device.

The DLP setting field 106 includes a field 110 for displaying a list of names of DLPs to choose from, and a button group 112 for instructing DLPs to be imported, generated, and optimized.

In step S3, the medium profile generator 56 generates a medium profile 120 (see FIG. 6) from the combination of types edited in steps S1 and S2. More specifically, in response to the operator clicking on a button of the button group 108 (see FIG. 5), i.e., the "OK" button, and on a button of the button group 82 (see FIG. 4), i.e., the "SAVE" button, the medium profile generator 56 acquires the types through the input unit 44, and generates a medium profile 120, which is named "Medium Profile" (see the name setting field 84 in FIG. 4).

Figure 6:
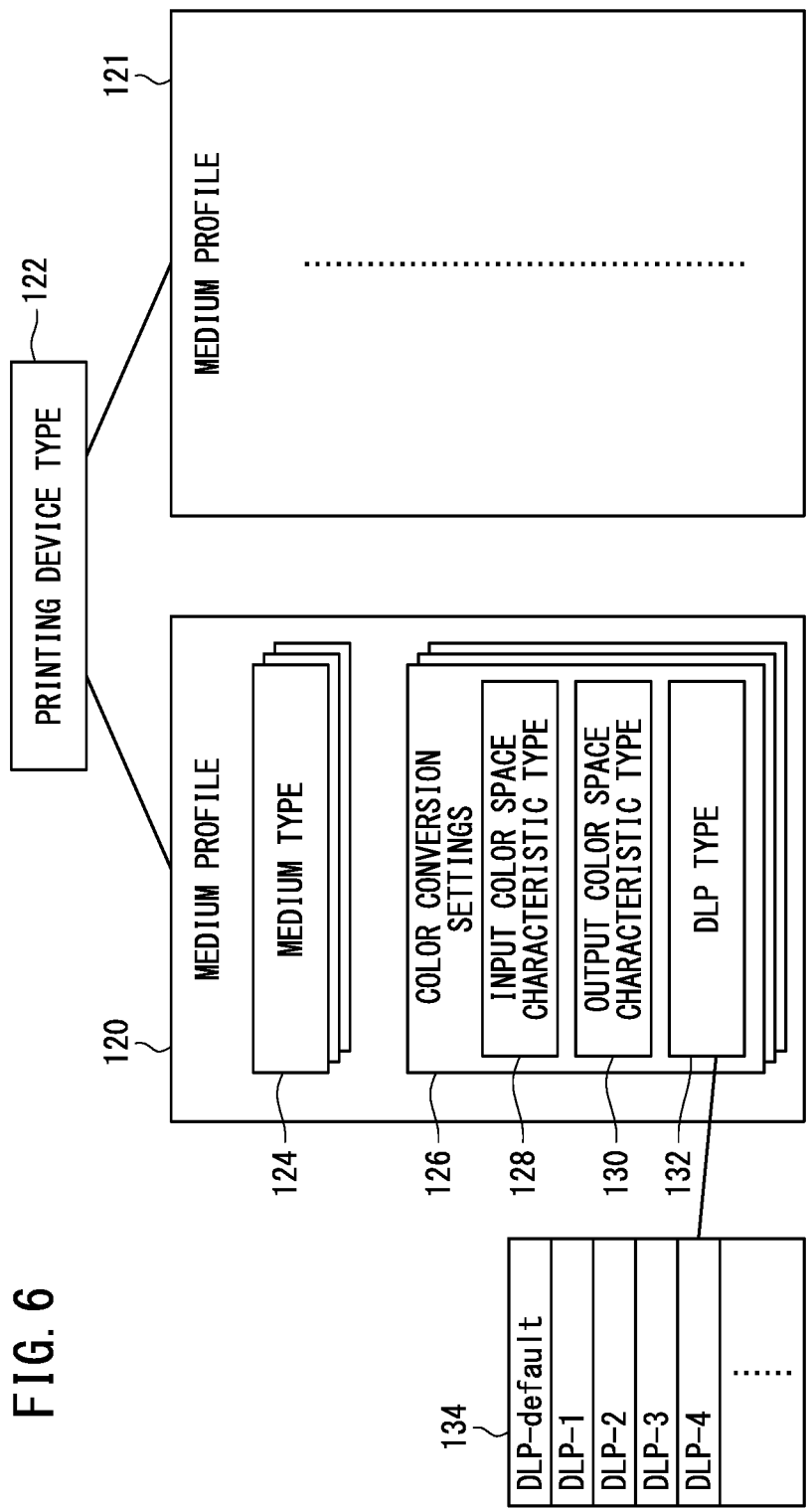
FIG. 6 is a diagram showing a data structure of medium profiles.

FIG. 6 shows schematically the data structure of the medium profile 120. As shown in FIG. 6, one or more medium profiles, more specifically, two medium profiles 120 and 121, are associated with one printing device type data 122. Since the data structures of the medium profiles 120, 121 are identical, the data structure of the medium profile 121 is omitted from illustration.

The medium profile 120 has one or more medium type data 124 corresponding to the content of the field 90 (see FIG. 4) and one or more color conversion setting data 126 corresponding to the content of the field 94 (see FIG. 4). The color conversion setting data 126 are made up of input color space characteristic type data 128 corresponding to the content of the input characteristics setting field 102 (see FIG. 5), output color space characteristic type data 130 corresponding to the content of the output characteristics setting field 104 (see FIG. 5), and DLP type data 132 corresponding to the content of the field 110 (see FIG. 5).

The DLP type data 132 are data selected from a database (DLP list 134) constructed in the RIP 20 (see FIG. 1) or an external device, e.g., the server 16 (see FIG. 1). Stated otherwise, each DLP is associated with a combination of a printing device type, a medium type, an input color space characteristic type, and an output color space characteristic type. According to the present embodiment, the DLP list 134 is linked to types of printing conditions through the medium profile 120. However, the DLP list 134 may be managed in other ways.

The generated medium profile 120 is stored in a database constructed in the server 16 or the like. The database manages various data according to the data structure shown in FIG. 6. More specifically, the color conversion setting data 126, which represent a set of types of input color space characteristics, output color space characteristics, and device link profiles, are defined as a data set. The medium profile 120, which represent a set of at least one type of print medium 35 and at least one type of color conversion setting, is defined as a data set. Furthermore, a set of at least one type of printing device and at least one type of medium profile 120 is defined as a data set.

In step S4, the controller 36 judges whether or not an instruction has been issued to execute a printing job. If the controller 36 determines that no such instruction exists (step S4: NO), then step S4 is repeated. If the controller 36 determines that such an instruction exists (step S4: YES), then control proceeds to step S5.

In step S5, the printing condition designator 58 designates printing conditions for the printing job, execution of which was instructed in step S4. Prior to making such a designation, the RIP 20 displays a setting screen 150 (see FIG. 7) for use in setting a profile. In response to an instruction to start making settings, the display data generator 52 generates display data for the setting screen 150, and then supplies the generated display data to the display controller 40. As shown in FIG. 7, the display controller 40 displays a window W3 including the setting screen 150 on the display unit 42.

As shown in FIG. 7, the setting screen 150 includes five designation fields 152, 153, 154, 155, 156, a single display field 158, and a button group 160.

Each of the designation fields 152, 153, 154, 155, 156 comprises a combo box. The designation fields 152, 153, 154, 155, 156 are arranged successively downward to enable entry of a printing device type, a medium type, an input color space characteristic type, an output color space characteristic type, and a type (type) of medium profile 120 respectively therein.

The button group 160 includes three buttons, i.e., a "DLP OPTIMIZE" button 162, an "OK" button 163, and a "CANCEL" button 164. The "OK" button 163 functions as the setting instructor 70 for setting and instructing a DLP to be applied to a printing job that is to be executed.

In step S6, the profile retriever 60 judges whether or not a DLP corresponding to the printing conditions has been designated in step S5. More specifically, in line with the designations made via the designation fields 152 through 156, the profile retriever 60 initiates retrieval of the content of the medium profile 120 generated in step S3. The medium profile 120 functions as a data set for specifying a retrieval range for a combination of types.

If it is judged that a combination of types exists (step S6: YES), then in step S7, the profile retriever 60 selects a DLP corresponding to the combination of types. If it is judged that a combination of types does not exist (step S6: NO), then in step S8, the profile retriever 60 selects a predetermined default DLP.

According to the present embodiment (see FIGS. 4, 5 and 7), within the medium profile "Medium Profile", a combination of types is provided, including a device type "Device-A", a medium type "Medium-4", input color space characteristics "Coated FOGRA 39", and input color space characteristics "Device-A-glossy". Therefore, the name of the DLP "DLP-1", which corresponds to such a combination, is displayed in the display field 158.

The operator may click on a button (in particular the "OPTIMIZE" button) of the button group 112 shown in FIG. 5, and the "DLP OPTIMIZE" button 162 shown in FIG. 7, in order to evaluate color reproduction with the DLP saved at present, or to update the currently saved DLP.

In step S9, the profile setter 62 sets one DLP with respect to the printing job, execution of which was instructed in step S4, based on the retrieval results produced in steps S6 through S8. More specifically, the profile setter 62 sets a DLP selected from among the data of the database (the DLP list 134 and the medium profile 120 in FIG. 6). In the present embodiment, in response to the operator clicking on the "OK" button 163, the profile setter 62 sets "DLP-1" with respect to the printing job.

In step S10, a proofreading and printing process is carried out. More specifically, the profile acquirer 64 acquires the DLP, which was set in step S9, i.e., "DLP-1" in the present embodiment. The rasterizer 66 performs a rasterizing process on the page description data based on various processing conditions, including the DLP acquired by the profile acquirer 64, to thereby generate printing data that is used during printing. The RIP 20 supplies the generated printing data to the proof press 24 or the platesetter 28. In this manner, the proof press 24 or the offset press 32 is made capable of producing a proof 22 or a print 30.

As described above, the profile setting apparatus includes the printing condition designator 58 for designating, with respect to a printing job to be executed, a combination of types of a printing device (the proof press 24 or the offset press 32), the print medium 35, input color space characteristics which are color space characteristics of an object to be reproduced, and output color space characteristics which are color space characteristics of a print (the proof 22 or the print 30), and the profile setter 62 for setting a DLP corresponding to the designated combination with respect to the printing job to be executed. Therefore, a DLP can be selected without special concerns over the type of DLP, and a DLP suitable for a printing job can be set easily and reliably.

Although a certain preferred embodiment of the present invention has been shown and described in detail, it should be understood that various changes and modifications may be made to the embodiment without departing from the scope of the invention as set forth in the appended claims.

What is claimed is:

1. A profile setting apparatus for setting a device link profile for each of respective printing jobs as a job execution unit for producing a print, by forming an image on a print medium with a printing device, comprising:
    a printing condition designator for designating, with respect to a printing job to be executed, a combination of types of the printing device, the print medium, an input color space characteristic which is a color space characteristic of an object to be reproduced, and an output color space characteristic which is a color space characteristic of the print;
    a profile setter for setting a device link profile corresponding to the combination designated by the printing condition designator, with respect to the printing job to be executed; and
    a profile retriever for retrieving the device link profile corresponding to the combination, by referring to a database with respect to the device link profile,
    wherein the profile setter sets the device link profile that is retrieved by the profile retriever.

2. The profile setting apparatus according to claim 1, wherein if a device link profile corresponding to the combination does not exist, the profile retriever selects a predetermined default device link profile.

3. The profile setting apparatus according to claim 1, wherein a color conversion setting representing a set of types of the input color space characteristic, the output color space characteristic, and the device link profile is defined as a data set in the database.

4. The profile setting apparatus according to claim 3, wherein a medium profile representing a set of at least one type of the print medium and at least one type of the color conversion setting is defined as a data set in the database.

5. The profile setting apparatus according to claim 4, wherein a set of one type of the printing device and at least one type of the medium profile is defined as a data set in the database.

6. The profile managing system comprising:
    the profile setting apparatus according to claim 1; and
    a server capable of communicating with the profile setting apparatus,
    wherein the database is constructed in the server.

7. A profile setting method to be carried out using an apparatus for setting a device link profile for each of respective printing jobs as a job execution unit for producing a print, by forming an image on a print medium with a printing device, comprising the steps of:
    designating, with respect to a printing job to be executed, a combination of types of the printing device, the print medium, an input color space characteristic which is a color space characteristic of an object to be reproduced, and an output color space characteristic which is a color space characteristic of the print;
    setting a device link profile corresponding to the designated combination with respect to the printing job to be executed; and
    retrieving the device link profile corresponding to the combination, by referring to a database with respect to the device link profile,
    wherein the setting sets the device link profile that is retrieved.

8. A non-transitory storage medium storing therein a program for setting a device link profile for each of respective printing jobs as a job execution unit for producing a print, by forming an image on a print medium with a printing device, the program enabling a computer to perform the steps of:
    designating, with respect to a printing job to be executed, a combination of types of the printing device, the print medium, an input color space characteristic which is a color space characteristic of an object to be reproduced, and an output color space characteristic which is a color space characteristic of the print;
    setting a device link profile corresponding to the designated combination with respect to the printing job to be executed; and
    retrieving the device link profile corresponding to the combination, by referring to a database with respect to the device link profile,
    wherein the setting sets the device link profile that is retrieved.

* * * * *